United States Patent [19]

Chiang

[11] 4,255,393
[45] Mar. 10, 1981

[54] METHOD OF PRECIPITATING ADU

[75] Inventor: Peter T. Chiang, Monroeville, Pa.

[73] Assignee: Westinghouse Electric Corp., Pittsburgh, Pa.

[21] Appl. No.: 34,309

[22] Filed: Apr. 30, 1979

[51] Int. Cl.³ .................. C01G 1/00; C01G 56/00
[52] U.S. Cl. ............................. 423/15; 423/253
[58] Field of Search ............................ 423/15, 253

[56] References Cited

U.S. PATENT DOCUMENTS

| 3,726,650 | 4/1973 | Welty | 423/15 |
| 3,758,664 | 9/1973 | Gerrald | 423/15 |
| 3,961,027 | 6/1976 | Crossley | 423/15 X |
| 3,998,925 | 12/1976 | Fuller | 423/15 |

*Primary Examiner*—Richard E. Schafer
*Attorney, Agent, or Firm*—R. D. Fuerle

[57] ABSTRACT

A process is disclosed for improving the quality of an ammonium diuranate (ADU) precipitate. Ammonium hydroxide is added to a solution of uranyl fluoride in the presence of a polymer such as polyacrylic acid, polyacrylonitrile, or polyacrylamide. The presence of the polymer reduces the particle size of the precipitate and increases its settling rate. A reduced particle size provides an ADU powder which is suitable for nuclear fuel fabrication and an increased settling rate enhances the dewatering operation of the ADU slurry.

12 Claims, No Drawings

METHOD OF PRECIPITATING ADU

BACKGROUND OF THE INVENTION

In the manufacture of fuel pellets for use in nuclear reactor fuel rods, ammonium diuranate (ADU) is precipitated from a solution of uranyl fluoride by the addition of ammonium hydroxide. The precipitated ADU is then filtered, dried, calcined, and pressed into the pellets.

The filtration of the ADU is facilitated by a rapid settling rate, so that large quantities of slurry can be quickly processed. The calcination and pellet-sintering are facilitated by a precipitate of a small particle size because the greater surface area increases the reaction rate. Unfortunately, a rapid settling rate and a small particle size are generally opposing properties because small particles do not settle rapidly.

SUMMARY OF THE INVENTION

I have discovered that an ADU precipitate which is of a small particle size and which settles rapidly can be obtained if the precipitation is performed in the presence of an additive of an acrylic polymer. My improvement enables one to obtain the desired degree of particle fineness by adjusting the amount of additive while a practical slurry settling rate is maintained. The improvement adds very little to the cost of the operation and does not interfere with subsequent processing steps.

THE INVENTION

Enriched uranium (about 3 to 4% by weight U) in the form of uranium hexafluoride gas is reacted with water to produce a solution of uranyl fluoride and hydrogen fluoride according to the equation:

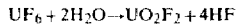

$$UF_6 + 2H_2O \rightarrow UO_2F_2 + 4HF$$

A uranyl fluoride solution may contain about 10 to about 250 gms/l of uranium but below about 80 gms/l the process becomes uneconomical because too much water must be processed, and above about 160 gms/l it becomes difficult to keep all of the uranyl fluoride in solution.

Ammonium diuranate is precipitated from the uranyl fluoride solution by the addition of ammonium hydroxide according to the equation:

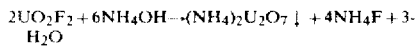

$$2UO_2F_2 + 6NH_4OH \rightarrow (NH_4)_2U_2O_7 \downarrow + 4NH_4F + 3H_2O$$

The ammonium hydroxide may be added as a ammonium hydroxide solution but it is preferably added as gaseous ammonia which forms ammonium hydroxide in place, as it is believed that gaseous ammonia produces a finer precipitate. If an ammonium hydroxide solution is used it can be about 10 to about 28% (all percentages herein are by weight) ammonia, but less than about 24% ammonia is uneconomical due to the large amounts of water that must be processed, and 28% is the commercially available aqueous ammonia. The ammonium hydroxide solution or the ammonia gas is mixed with the uranyl fluoride solution in a proportion which provides excess ammonia to insure that all of the uranium is precipitated. About 10 to about 40 moles of ammonia can be used per mole of uranium, but less than about 22 moles $NH_3$ per mole U may leave economically recoverable amounts of uranium unprecipitated and more than about 30 moles $NH_3$ per mole of U may cause costly environmental problems due to the high concentration of ammonia in waste streams.

The polymer which improves the quality of the precipitate can be added to either the ammonium hydroxide solution, the uranyl fluoride solution, or to the two solutions after they are mixed. It is preferred to add the polymer to the ammonium hydroxide solution if an ammonium hydroxide solution is used, so that the polymer is not subjected to the high acidic fluoride solution which may cause it to precipitate. If an ammonium hydroxide solution is not used the polymer is preferably added to the mixture of the uranyl fluoride solution and ammonia. The concentration of the polymer in the final ADU slurry may be about 0.05 to about 0.5 gms/l, but is preferably at least about 0.1 gms/l as less results in a coarser precipitate, and it is preferably less than about 0.3 gms/l as more may make the precipitate so fine that the subsequently formed $UO_2$ may be too fine and overreactive.

The acrylic polymer is a water soluble, generally linear polymer having a molecular weight of about 10,000 to about 150,000. Polyacrylic acid, polyacrylonitrile, polyacrylamide, polymethacrylic acid, polymethacrylonitrile, and polymethacrylamide may be used, but polyacrylic acid is preferred as it has been found to work well.

The following examples further illustrate this invention.

EXAMPLE I

ADU precipitation from uranyl fluoride solution containing 159 g/l U using concentrated ammonium hydroxide (28% $NH_3$) was carried out continuously. The average flow rates for the uranyl fluoride and ammonium hydroxide solutions were 71.5 and 78.8 ml/min, respectively. The precipitation temperature was maintained at 29° C. while the residence time in the precipitator amounted to 7.9 minutes. ADU slurry samples for setting rate determination and powder-property evaluation were taken only after the system had reached a steady-state. ADU powder was obtained by filtering the slurry sample and drying the filter cake first at ambient temperature for 24 hours and then at 150° C. for 15 hours. Results on ADU slurry settling rate, ADU powder surface area and tap density are given in the table which follows Example II.

EXAMPLE II

A 25% solution of polyacrylic acid, molecular weight less than 150,000 pH=2 as 5% solution, Bookfield viscosity=18 cps at 5% concentration and 3,000 cps at 25% concentration, sold by Rohn and Haas Company as "Acrysol A-3," in an amount equivalent to 0.24 gram per liter of ADU slurry, was added to the ammonium hydroxide solution prior to the ADU precipitation with concentrated ammonium hydroxide carried out in the same apparatus as Example I. The other conditions such as uranium concentration, flow rate, temperature, residence time, sampling, ADU slurry settling test, ADU powder preparation and evaluation were identical to the ones described in Example I. Results on ADU slurry settling rate, ADU powder surface area, and tap density are presented in the table which follows. ADU precipitated in the presence of Acrysol A-3 settles much faster then the ADU precipitated without Acrysol A-3 (50.0 vs. 17.7 mm/min). Moreover, the surface area of the ADU powder made with the Acrysol A-3 addition is about 6 times larger than the surface area of the ADU powder obtained without the additive (35.9 vs. 6.05 m²/g). This indicates Acrysol A-3 acts not only as an effective retardant on ADU particle growth but also as a good flocculant for the ADU particles.

EFFECT OF ADDITIVE ON ADU PHYSICAL PROPERTIES

| Example | Additive | ADU Slurry Settling Results | | | | ADU Powder Properties | |
|---|---|---|---|---|---|---|---|
| | | Volume % Precipitate* After | | | Settling Rate at 25° C., mm/min | Surface Area (BET technique) m²/g | Tap Density g/cc |
| | | 5 min. | 30 min. | 60 min. | | | |
| 1 | None | 50 | 16 | 15 | 17.7 | 6.05 | 1.16 |
| 2 | Acrysol A-3 0.24 g/l | 32 | 23 | 23 | 50.0 | 35.9 | 1.11 |

*In 100-ml graduated cylinder

I claim:

1. In a method of precipitating ammonium diuranate by the addition of ammonia gas or a solution of ammonium hydroxide to an aqueous solution of uranyl fluoride, the improvement which comprises increasing the settling rate and reducing the particle size of the precipitate by conducting said precipitation in the presence of about 0.05 to about 0.5 grams per liter of an acrylic polymer.

2. A method according to claim 1 wherein said acrylic polymer is selected from the group consisting of polyacrylic acid, polyacrylamide, polyacrylonitrile, polymethacrylic acid, polymethacrylamide, and polymethacrylonitrile.

3. A method according to claim 1 wherein said polymer is polyacrylic acid.

4. A method according to claim 1 wherein the concentration of said polymer is about 0.1 to about 0.3 grams per liter.

5. A method according to claim 1 wherein said polymer is added to said ammonium hydroxide solution before said ammonium hydroxide solution is added to said solution of uranyl fluoride.

6. A method according to claim 1 wherein the concentration of uranium in said uranyl fluoride solution is about 10 to about 250 grams per liter.

7. A method according to claim 6 wherein the concentration of uranium in said uranyl fluoride solution is about 80 to about 160 grams per liter.

8. A method according to claim 1 wherein the concentration of ammonia in said ammonium hydroxide solution is about 10 to about 28%.

9. A method according to claim 8 wherein the concentration of ammonia in said ammonium hydroxide solution is about 24 to about 28%.

10. A method according to claim 1 wherein the concentration of ammonia is about 10 to about 40 moles per mole of uranium.

11. A method according to claim 10 wherein the concentration of ammonia is about 22 to about 30 moles per mole of uranium.

12. A method according to claim 1 wherein ammonia gas is used.